(12) United States Patent
Kim et al.

(10) Patent No.: US 9,178,678 B2
(45) Date of Patent: *Nov. 3, 2015

(54) METHOD AND APPARATUS FOR SUPPORTING HARQ

(71) Applicant: LG ELECTRONICS INC., Seoul (KR)

(72) Inventors: Hak Seong Kim, Anyang-si (KR); Joon Kui Ahn, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/606,739

(22) Filed: Jan. 27, 2015

(65) Prior Publication Data

US 2015/0146661 A1 May 28, 2015

Related U.S. Application Data

(63) Continuation of application No. 14/209,865, filed on Mar. 13, 2014, now Pat. No. 8,977,923, which is a continuation of application No. 13/601,144, filed on Aug. 31, 2012, now Pat. No. 8,713,394, which is a (Continued)

(30) Foreign Application Priority Data

Dec. 17, 2008 (KR) .................. 10-2008-0128471

(51) Int. Cl.
*G06F 11/00* (2006.01)
*H04L 5/00* (2006.01)
(Continued)

(52) U.S. Cl.
CPC ............ *H04L 5/0057* (2013.01); *H04L 1/0004* (2013.01); *H04L 1/0026* (2013.01);
(Continued)

(58) Field of Classification Search
CPC .......... H04W 72/042; H04W 72/0413; H04W 72/0406; H04W 72/04; H04W 72/1284; H04W 72/085; H04W 48/12; H04W 72/00; H04W 72/12; H04W 72/1231; H04W 72/1242; H04W 74/004; H04W 28/16
USPC ................................................. 714/748, 749
See application file for complete search history.

(56) References Cited

U.S. PATENT DOCUMENTS 5,483,676 A 1/1996 Mahany et al.
7,720,041 B2 5/2010 Frederiksen et al.
(Continued)

FOREIGN PATENT DOCUMENTS

CN 1768497 5/2006
CN 1930801 3/2007
(Continued)

OTHER PUBLICATIONS

The State Intellectual Property Office of the People's Republic of China Application Serial No. 200980104009.4, Certificate dated Apr. 16, 2014, 22 pages.

(Continued)

*Primary Examiner* — Bryce Bonzo
*Assistant Examiner* — Elmira Mehrmanesh
(74) *Attorney, Agent, or Firm* — Lee, Hong, Degerman, Kang & Waimey

(57) ABSTRACT

A method of supporting Hybrid Automatic Repeat Request (HARQ) includes receiving an initial uplink grant on a downlink channel, transmitting uplink data on an uplink channel using the initial uplink grant, receiving a request for retransmission of the uplink data, determining at least one transmission parameter of a channel quality indicator (CQI) from the initial uplink grant, multiplexing retransmission data of the uplink data with the CQI, and transmitting the multiplexed data on the uplink channel. Amount of resources for transmission of the CQI is determined based on the at least one transmission parameter.

10 Claims, 13 Drawing Sheets

Related U.S. Application Data continuation of application No. 12/364,190, filed on Feb. 2, 2009, now Pat. No. 8,281,201.

(60) Provisional application No. 61/025,811, filed on Feb. 3, 2008.

(51) Int. Cl.
  *H04L 1/00* (2006.01)
  *H04L 1/18* (2006.01)

(52) U.S. Cl.
  CPC ............... *H04L1/0027* (2013.01); *H04L 1/18* (2013.01); *H04L 1/1854* (2013.01); *H04L 1/1861* (2013.01); *H04L 1/1887* (2013.01); *H04L 1/0009* (2013.01); *H04L 1/1812* (2013.01)

(56) References Cited

U.S. PATENT DOCUMENTS

| | | | |
|---|---|---|---|
| 7,912,133 | B2 | 3/2011 | Cheon et al. |
| 8,107,394 | B2 | 1/2012 | Kim et al. |
| 8,151,154 | B2 | 4/2012 | Sagfors et al. |
| 8,169,957 | B2 | 5/2012 | Damnjanovic |
| 8,281,201 | B2* | 10/2012 | Kim et al. ............ 714/748 |
| 8,977,923 | B2* | 3/2015 | Kim et al. ............ 714/748 |
| 2003/0174669 | A1 | 9/2003 | Roh et al. |
| 2003/0210668 | A1 | 11/2003 | Malladi et al. |
| 2003/0236071 | A1 | 12/2003 | Ito |
| 2004/0058687 | A1 | 3/2004 | Kim et al. |
| 2005/0201295 | A1 | 9/2005 | Kim et al. |
| 2006/0215603 | A1 | 9/2006 | Nishio et al. |
| 2006/0233127 | A1 | 10/2006 | Derryberry et al. |
| 2007/0047451 | A1 | 3/2007 | Lohr et al. |
| 2007/0093209 | A1 | 4/2007 | Agrawal et al. |
| 2007/0274343 | A1 | 11/2007 | Nishio |
| 2008/0095252 | A1 | 4/2008 | Kim et al. |
| 2008/0311919 | A1 | 12/2008 | Whinnett et al. |
| 2009/0046805 | A1 | 2/2009 | Kim et al. |
| 2009/0103482 | A1 | 4/2009 | Imamura et al. |
| 2009/0122736 | A1 | 5/2009 | Damnjanovic et al. |
| 2010/0046460 | A1 | 2/2010 | Kwak et al. |
| 2010/0322165 | A1 | 12/2010 | Yoo |
| 2014/0192749 | A1 | 7/2014 | Kim et al. |

FOREIGN PATENT DOCUMENTS

| | | |
|---|---|---|
| EP | 1142187 | 10/2001 |
| JP | 2008-289114 | 11/2008 |
| WO | 2007/088629 | 8/2007 |
| WO | 2007/107944 | 9/2007 |
| WO | 2008/014275 | 1/2008 |
| WO | 2008/093644 | 8/2008 |
| WO | 2008/115837 | 9/2008 |
| WO | 2009/078146 | 6/2009 |

OTHER PUBLICATIONS

The State Intellectual Property Office of the People's Republic of China Application Serial No. 200980104009.4, Office Action dated Jun. 20, 2013, 5 pages.

Panasonic, "DCT Partitioning for CQI Reporting", R1-073631, 3GPP TSG-RAN WG1 Meeting #50, Aug. 2007.

Ericsson, "CQI Reporting on the PUSCH", R1-080363, 3GPP TSG-RAN WG1 #51bis, Jan. 2008.

Alcatel-Lucent, "Power Offsets to Support Data and Control Multiplexing for Persistent PUSCH," R1-080912, 3GPP TSG RAN WG1 #52, Jan. 2008, XP-050109386.

Qualcomm Europe, "Rate Matching Details for Control and Data Multiplexing," R1-073269, 3GPP TSG RAN WG1 #50, Aug. 2007, XP-050106904.

Motorola, "UL L1/L2 Control Signals with Data: Multiplexing Detail," R1-073388, 3GPP TSG RAN1 #50, Aug. 2007, XP-050107012.

Samsung, "RV Definition for UL-SCH," R1-080043, 3GPP TSG RAN WG1 Meeting #51bis, Jan. 2008, XP-050108586.

Ericsson, "CQI Reporting on the PUSCH," GPP TSG-RAN WG1 #51bis, R1-080363, Jan. 2008, 2 pages.

Qualcomm Europe, "Rate matching details for control and data multiplexing," An5xter73GPP TSG-RAN WG1 #50, R1-073269, Aug. 2007, 6 pages.

Korean Intellectual Property Office Application Serial No. 10-2008-0128471, Notice of Allowance dated Jul. 29, 2015, 2 pages.

Intellectual Property Office of India Application Serial No. 2646/KOLNP/2010, Office Action dated Jul. 30, 2015, 2 page.

* cited by examiner

METHOD AND APPARATUS FOR SUPPORTING HARQ

CROSS-REFERENCE TO RELATED APPLICATIONS

This application is a continuation of U.S. patent application Ser. No. 14/209,865, filed on Mar. 13, 2014, now U.S. Pat. No. 8,977,923, which is a continuation of U.S. patent application Ser. No. 13/601,144, filed on Aug. 31, 2012, now U.S. Pat. No. 8,713,394, which is a continuation of U.S. patent application Ser. No. 12/364,190, filed on Feb. 2, 2009, now U.S. Pat. No. 8,281,201, which claims the benefit of earlier filing date and right of priority to Korean Patent Application No. 10-2008-0128471, filed on Dec. 17, 2008, and also claims the benefit of U.S. Provisional Application No. 61/025,811, filed on Feb. 3, 2008, the contents of which are all hereby incorporated by reference herein in their entirety.

BACKGROUND

1. Field of the Invention

The present invention relates to wireless communications, and more particularly, to a method and apparatus for supporting hybrid automatic repeat request (HARQ) in a wireless communication system.

2. Related Art

Wireless communication systems are widely spread all over the world to provide various types of communication services such as voice or data. In general, the wireless communication system is a multiple access system capable of supporting communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

Current development in advanced wireless communication has led to the requirement of high spectral efficiency and reliable communication. Unfortunately, packet errors by fading channel environment and interferences originated from various sources make the capacity of overall system to be limited.

Hybrid automatic repeat request (HARQ) is an ARQ protocol combined with forward error correction (FEC) and is strongly considered as one of cutting edge technologies for future reliable communication. The HARQ scheme can largely be classified into two types. One is HARQ-chase combining (CC) which is disclosed in D. Chase, Code Combining: A maximum-likelihood decoding approach for combining an arbitrary number of noisy packets, IEEE Trans. on Commun., Vol. 33, pp. 593-607, May 1985. The other is HARQ-Increment Redundancy (IR). In the HARQ-CC, when a receiver detects an error through cyclic redundancy checking (CRC) while decoding the transmitted packet, the same packet with the same modulation and coding is retransmitted to the receiver. Meanwhile, in order to achieve a coding gain, the HARQ-IR retransmits different packets, in which parity bits can be manipulated through puncturing and repetition. To perform the HARQ, there is a need to exchange acknowledgement (ACK)/not-acknowledgement (NACK) information that indicates whether retransmission is necessary.

Adaptive modulation and coding (AMC) is also a technology for providing reliable communication. A base station (BS) determines a modulation and coding scheme (MCS) used for transmission by using a channel quality indicator (CQI) received from a user equipment (UE). In general, the CQI is an index of an entity of an MCS table showing a plurality of MCSs. The UE transmits the CQI by using two methods. One is that the CQI is transmitted periodically. The other is that the CQI is transmitted at the request of the BS.

$3^{rd}$ generation partnership project (3GPP) long term evolution (LTE) is a part of an evolved-universal mobile telecommunications system (E-UMTS) using evolved-universal terrestrial radio access (E-UTRA), and adopts the OFDMA in downlink and the SC-FDMA in uplink. Resource allocation of the 3GPP LTE is based on dynamic scheduling. A downlink physical channel of the 3GPP LTE can be divided into a physical downlink control channel (PDCCH) for carrying resource allocation information and a physical downlink shared channel (PDSCH) for carrying downlink data. An uplink physical channel can be divided into a physical uplink control channel (PUCCH) for carrying uplink control information and a physical uplink shared channel (PUSCH) for carrying uplink data. In downlink transmission, the UE first receives a downlink grant on the PDCCH, and then receives downlink data on the PDSCH indicated by the downlink grant. In uplink transmission, the UE receives an uplink grant on the PDCCH, and then transmits uplink data on the PUSCH indicated by the uplink grant. Dynamic scheduling is a method capable of effective resource allocation. However, the UE always has to receive the downlink/uplink grant first to transmit and/or receive data.

A signaling overhead is a major cause of low transmission efficiency and low frequency efficiency. In dynamic scheduling, in addition to reception of the PDCCH, the HARQ operation and the CQI transmission are carried out by using a plurality of signaling operations such as exchange of ACK/NACK information, exchange of a transmission parameter for the CQI, etc.

Accordingly, there is a need for a method capable of reducing a signaling overhead caused by CQI transmission in a process of performing HARQ.

SUMMARY

The present invention provides a method of multiplexing and transmitting a channel quality indicator (CQI) and retransmission data.

In an aspect, a method of supporting Hybrid Automatic Repeat Request (HARQ) in a wireless communication system is provide. The method includes receiving an initial uplink grant on a downlink channel, transmitting uplink data on an uplink channel using the initial uplink grant, receiving a request for retransmission of the uplink data, determining at least one transmission parameter of a channel quality indicator (CQI) from the initial uplink grant, multiplexing retransmission data of the uplink data with the CQI, wherein an amount of resources for transmission of the CQI is determined based on the at least one transmission parameter, and transmitting the multiplexed data on the uplink channel.

In some embodiments, the method may further include receiving a retransmission uplink grant for retransmission of the uplink data, wherein the retransmission data of the uplink data is multiplexed by using the retransmission uplink grant. A request for reporting the CQI may be included in the retransmission uplink grant.

The retransmission data of the uplink data may be multiplexed by using the initial uplink grant. The downlink channel may be a Physical Downlink Control Channel (PDCCH) and the uplink channel may be a Physical Uplink Shared Channel (PUSCH).

The at least one transmission parameter of the CQI may be related to a Modulation and Coding Scheme (MCS) of the CQI. The at least one transmission parameter of the CQI may be determined so that the MCS of the CQI is same as the MCS of the uplink data.

In another aspect, an apparatus for wireless communication is provided. The apparatus includes a Radio Frequency (RF) unit for transmitting and receiving a radio signal, and a processor coupled with the RF unit and configured to receive an initial uplink grant on a downlink channel, transmit uplink data on an uplink channel using the initial uplink grant, receive a request for retransmission of the uplink data, determine at least one transmission parameter of a CQI from the initial uplink grant, multiplex retransmission data of the uplink data with the CQI, wherein an amount of resources for transmission of the CQI is determined based on the at least one transmission parameter, and transmit the multiplexed data on the uplink channel.

A method of transmitting retransmission data together with a channel quality indicator (CQI) in a process of performing hybrid automatic repeat request (HARQ) is proposed. Accordingly, HARQ and adaptive modulation and coding (AMC) operations can be accurately performed, and a signaling overhead can be reduced.

DESCRIPTION OF EXEMPLARY EMBODIMENTS

The techniques described herein can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in downlink and uses the SC-FDMA in uplink.

For clarity, the following description will focus on the 3GPP LTE. However, the technical features of the present invention are not limited thereto.

Figure 1:
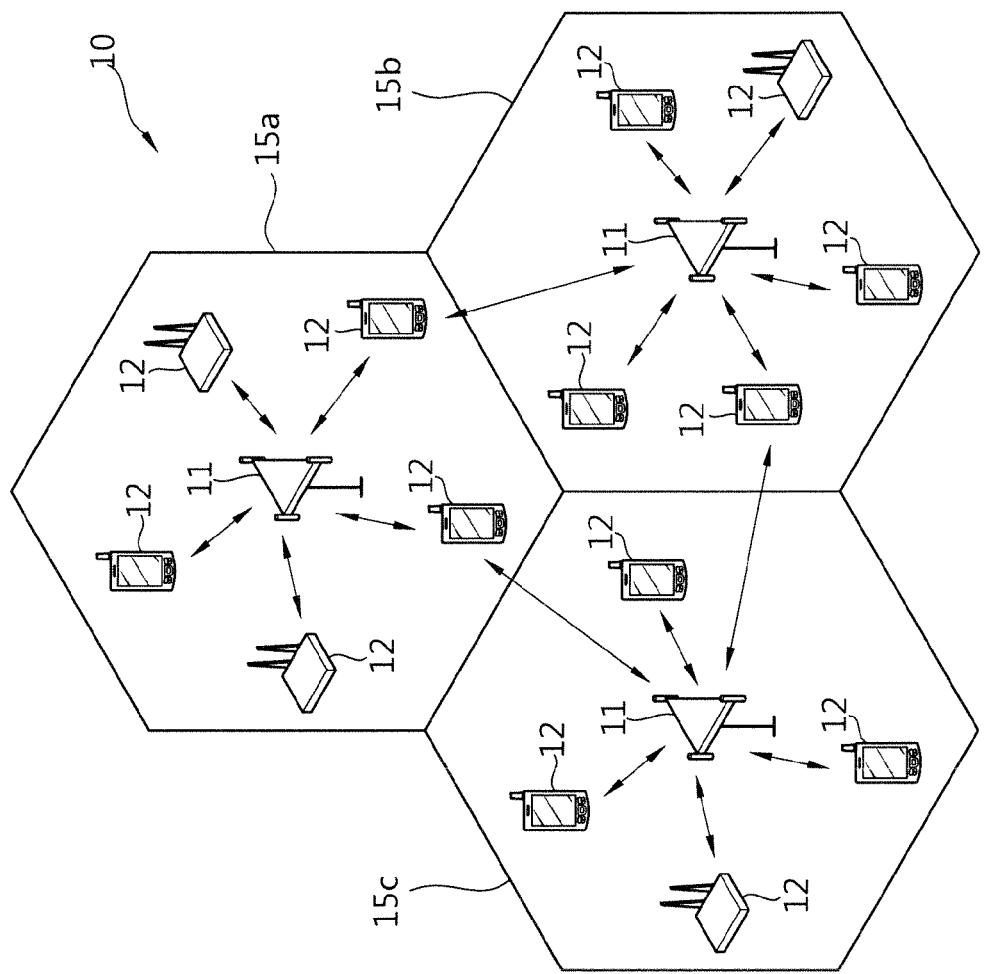
FIG. 1 shows a wireless communication system.

FIG. 1 shows a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, downlink (DL) denotes a communication link from the BS to the UE, and uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

The wireless communication system can support uplink and/or downlink hybrid automatic repeat request (HARQ). In addition, a channel quality indicator (CQI) can be used to support adaptive modulation and coding (AMC).

The CQI indicates a downlink channel state and may include a CQI index and/or a precoding matrix index (PMI). The CQI index indicates each entity of a modulation and coding scheme (MCS) table including a plurality of entities configured by combining coding rates and modulation schemes. The PMI is an index of a precoding matrix based on a codebook. The CQI may indicate a channel state for a full band and/or a channel state for some bands included in the full band.

Figure 2:
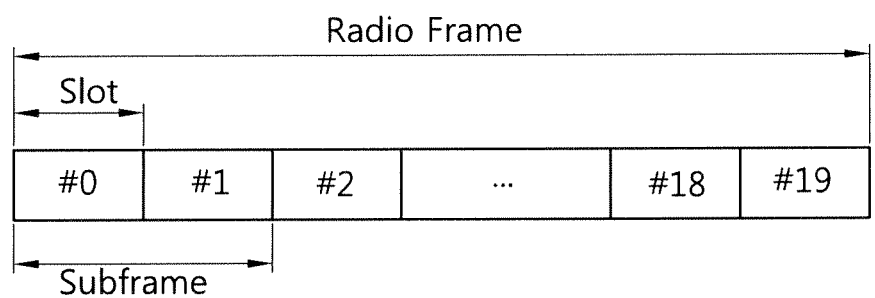
FIG. 2 shows a structure of a radio frame in $3^{rd}$ generation partnership project (3GPP) long term evolution (LTE).

FIG. 2 shows a structure of a radio frame in 3GPP LTE. The radio frame includes 10 subframes. One subframe includes two slots. A time for transmitting one subframe is defined as a transmission time interval (TTI). For example, one subframe may have a length of 1 millisecond (ms), and one slot may have a length of 0.5 ms. One slot includes a plurality of SC-FDMA symbols (e.g., 7 SC-FDMA symbols) in a time domain and a plurality of resource blocks (RBs) in a frequency domain. In the 3GPP LTE using the SC-FDMA symbol in uplink, the SC-FDMA symbol represents one symbol period. According to a system, the SC-FDMA symbol can also be referred to as an OFDMA symbol or a symbol period. The RB is a resource allocation unit, and includes a plurality of contiguous subcarriers in one slot.

The structure of the radio frame is shown for exemplary purposes only. Thus, the number of subframes included in the radio frame or the number of slots included in the subframe or the number of SC-FDMA symbols included in the slot may be modified in various manners.

Figure 3:
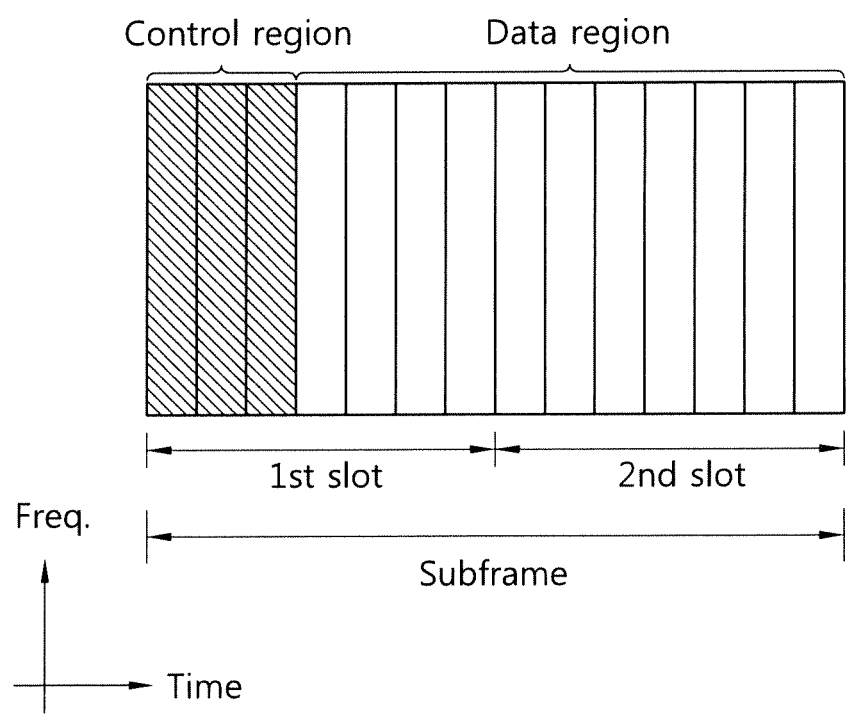
FIG. 3 shows an exemplary structure of a downlink subframe.

FIG. 3 shows an exemplary structure of a downlink subframe. The subframe includes two consecutive slots. A maximum of three OFDM symbols located in a front portion of a 1st slot within the downlink subframe correspond to a control region to be assigned with a physical downlink control channel (PDCCH). The remaining OFDM symbols correspond to a data region to be assigned with a physical downlink shared chancel (PDSCH). A physical control format indicator channel (PCFICH) is transmitted on a 1st OFDM symbol of the subframe and carries information regarding the number of OFDM symbols used for transmission of PDCCHs in the subframe.

The PDCCH carries a downlink grant that reports resource allocation of downlink transmission on the PDSCH. More specifically, the PDCCH can carry a transmission format and resource allocation of a downlink shared channel (DL-SCH), paging information on a paging channel (PCH), system information on the DL-SCH, resource allocation of a high-level control message such as a random access response transmitted on the PDSCH, a transmit power control command, activation of a voice over Internet protocol (VoIP), etc. Further, the PDCCH can carry an uplink grant that reports resource allocation of uplink transmission to the UE. The PCFICH reports to the UE the number of OFDM symbols used for the PDCCHs, and is transmitted in every subframe. A physical hybrid ARQ indicator channel (PHICH) is a response of uplink transmission and carries an HARQ acknowledgment (ACK)/not-acknowledgment (NACK) signal.

Figure 4:
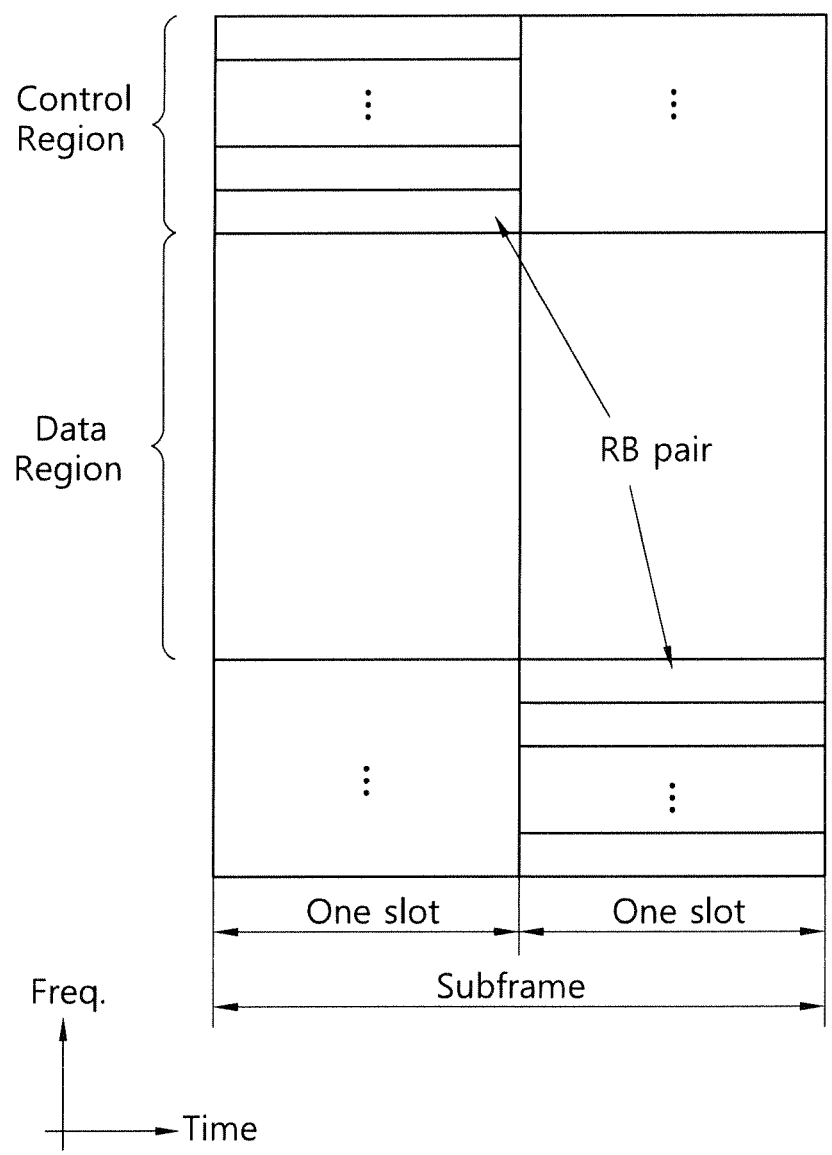
FIG. 4 shows a structure of an uplink subframe in 3GPP LTE.

FIG. 4 shows a structure of an uplink subframe in 3GPP LTE.

Referring to FIG. 4, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 5:
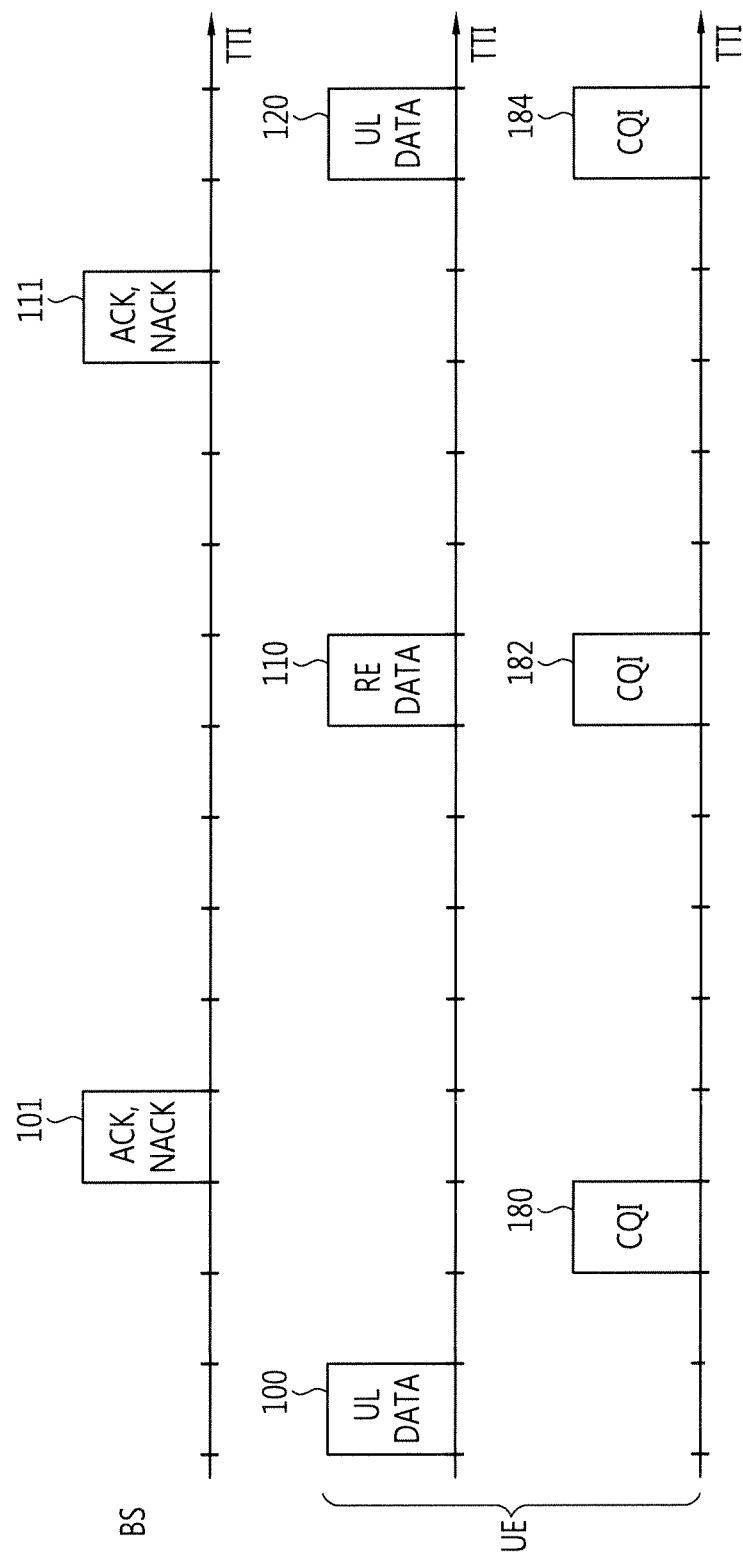
FIG. 5 shows uplink hybrid automatic repeat request (HARQ) and channel quality indicator (CQI) transmission.

FIG. 5 shows uplink HARQ and CQI transmission.

Referring to FIG. 5, upon receiving uplink data 100 on a PDSCH from a UE, a BS transmits an ACK/NACK signal 101 for the uplink data 100 on a PHICH after a specific time elapses. When the uplink data 100 is received, the BS may transmit the PHICH after a time corresponding to 4 TTIs elapses. However, the present invention is not limited thereto. If the uplink data is successfully decoded, the ACK/NACK signal 101 is an ACK signal. If the uplink data is unsuccessfully decoded, the ACK/NACK signal 101 is a NACK signal. When the ACK/NACK signal 101 is determined to be the NACK signal, retransmission data 110 for the uplink data 100 is retransmitted to the BS. Retransmission may be performed until the ACK signal is received or may be performed up to the number of times corresponding to the number of retransmission attempts. When an ACK/NACK signal 111 for the retransmission data 110 is determined to be the ACK signal, the UE can transmit new uplink data 120 to the BS.

Resource allocation or a transmission time point of an ACK/NACK signal for uplink/downlink data may be dynamically reported by the BS through signaling, or may be predetermined according to resource allocation or a transmission time point of the uplink/downlink data.

The UE can report a CQI to the BS periodically and/or non-periodically by measuring a downlink channel state. When the CQI is reported periodically, it implies that the CQI is transmitted without receiving an additional request from the BS according to a predetermined period or a period determined by the BS. When the CQI is reported non-periodically, it implies that the CQI is transmitted in response to a request from the BS. The CQI may be transmitted on a PUCCH or a PUSCH. When the CQI is multiplexed together with data, the CQI is transmitted always on the PUSCH. CQIs 180 and 184 are transmitted alone and may be transmitted on the PUCCH or the PUSCH. A CQI 182 is transmitted together with uplink data and may be transmitted only on the PUSCH. The CQI transmitted on the PUSCH may be a periodic CQI or a non-periodic CQI. The BS may use the CQI to perform downlink scheduling.

In the following description, uplink HARQ will be described. However, the technical features of the present invention will be easily applied to downlink HARQ by a person of ordinary skill in the art.

Figure 6:
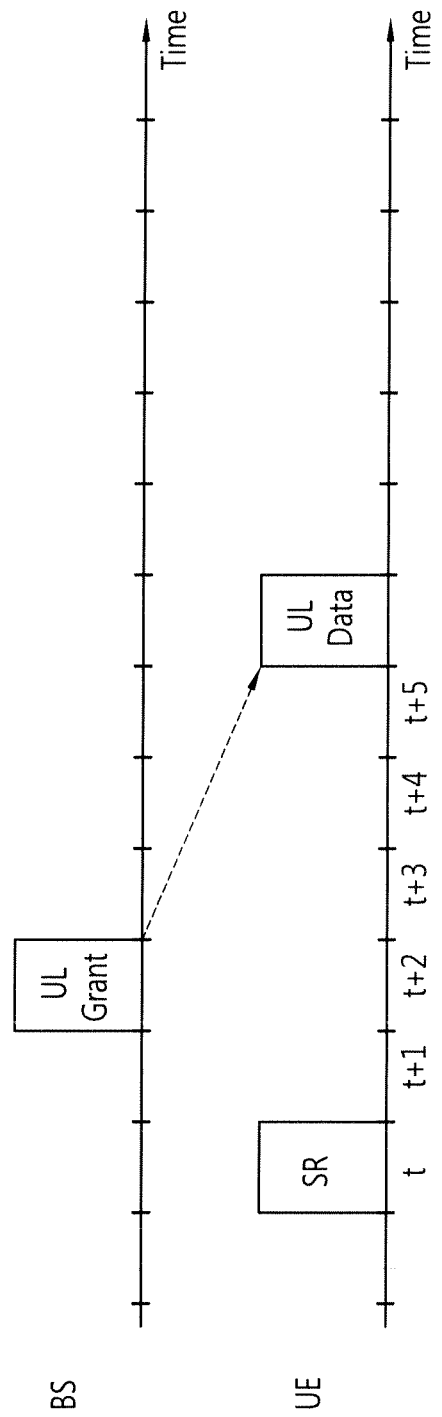
FIG. 6 shows dynamic scheduling in uplink transmission.

FIG. 6 shows dynamic scheduling in uplink transmission.

Referring to FIG. 6, for uplink transmission, a UE transmits a scheduling request (SR) to a BS on a PUCCH. The SR is used when the UE requests the BS to allocate uplink radio resources. The SR is a sort of preliminary information exchange for data exchange. In order for the UE to transmit uplink data to the BS, radio resource allocation is first requested by using the SR. In response to the SR, the BS transmits an uplink grant to the UE on a PDCCH. The uplink grant includes allocation of the uplink radio resources. The UE transmits the uplink data on the PUSCH by using the allocated uplink radio resources.

Figure 7:
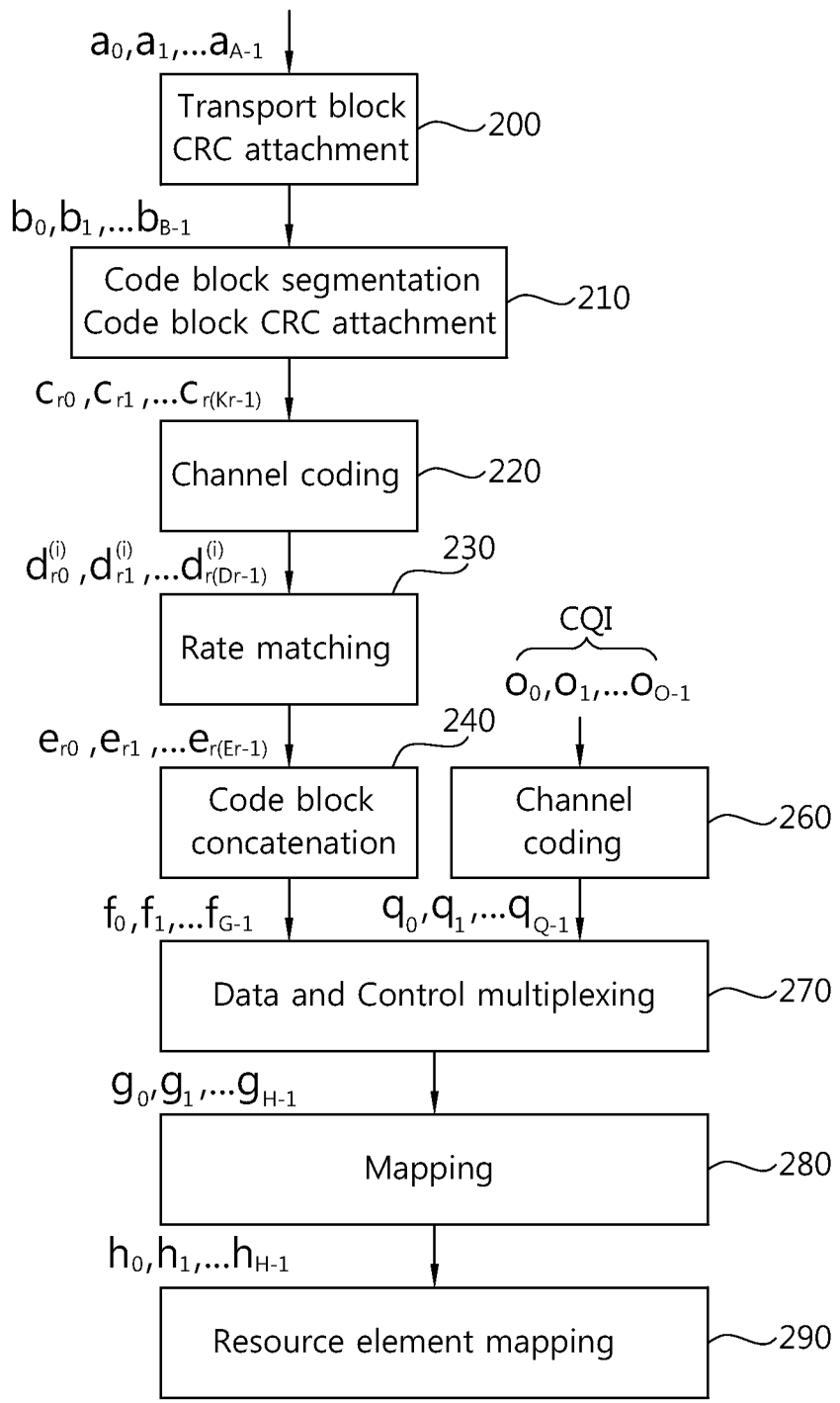
FIG. 7 is an exemplary diagram showing multiplexing of data and control information on a physical uplink shared channel (PUSCH).

FIG. 7 is an exemplary diagram showing multiplexing of data and control information on a PUSCH. The PUSCH carries data and/or control information through an allocation resource by using an uplink grant.

Referring to FIG. 7, data bits $a_0, a_1, \ldots, a_{A-1}$ are provided for each TTI in a format of one transport block. First, cyclic redundancy check (CRC) parity bits $p_0, p_1, \ldots, p_{L-1}$ are attached to the data bits $a_0, a_1, \ldots, a_{A-1}$ to generate CRC-attached bits $b_0, b_1, \ldots, b_{B-1}$ (step 200). Herein, B=A+L. Equation 1 below shows a relationship between $a_k$ and $b_k$.

$$b_k = a_k \text{ for } k=0,1,\ldots,A-1$$

$$b_k = p_{k-A} \text{ for } k=A,A+1,\ldots,A+L-1 \quad \text{[Equation 1]}$$

The CRC-attached bits $b_0, b_1, \ldots, b_{B-1}$ are segmented in a code block unit, and the CRC parity bits are re-attached in the code block unit (step 210). $c_{r0}, c_{r1}, \ldots, c_{r(Kr-1)}$ denote a bit sequence output after the code block segmentation. Herein, if a total number of code blocks is C, r denotes a code block number, and Kr denotes the number of bits for the code block number r.

Channel coding is performed on a bit sequence for a given code block (step 220). $d^{(i)}_0, d^{(i)}_1, \ldots, d^{(i)}_{D-1}$ denote encoded bits, D denotes the number of encoded bits for each output stream, and i denotes an index of a bit stream output from an encoder.

Rate matching is performed on the encoded bits (step 230). Then, code block concatenation is performed on the rate-matched bits (step 240). As a result, a data bit sequence $f_0, f_1, \ldots, f_{G-1}$ is generated. Herein, G denotes a total number of encoded bits used to transmit bits other than bits that is used in control information transmission when the control information is multiplexed on a PUSCH.

The control information can be multiplexed together with data. The data and the control information can use different coding rates by allocating a different number of coded symbols for transmission thereof. Hereinafter, a CQI is considered as the control information.

Channel coding is performed on CQI values $o_0, o_1, \ldots, o_{O-1}$ (where O is the number of CQI bits) to generate a control information bit sequence $q_0, q_1, \ldots, q_{Q-1}$ (step 260). The CQI can use independent channel coding different from that used for the data. For example, when a block code (32, O) is used as channel coding for the CQI, a basis sequence $M_{i,n}$ is as shown in Table 1 below.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

$b_0, b_1, \ldots, b_{31}$ denote an intermediate sequence for CQI channel coding and can be generated by Equation 2 below.

$$b_i = \sum_{n=0}^{O-1} (o_n \cdot M_{i,n}) \bmod 2, \quad \text{[Equation 2]}$$

where $i = 0, 1, 2, \ldots, 31$

The control information bit sequence $q_0, q_1, \ldots, q_{Q-1}$ is generated by cyclically repeating the intermediate sequence $b_0, b_1, \ldots, b_{31}$ according to Equation 3 below.

$$q_i = b_{(i \bmod 31)}, \text{ where } i=0,1,\ldots,Q-1 \quad \text{[Equation 3]}$$

A data bit sequence $f_0, f_1, \ldots, f_{G-1}$ is generated as described above and is multiplexed together with the control information bit sequence $q_0, q_1, \ldots, q_{Q-1}$ into a multiplexed sequence $g_0, g_1, \ldots, g_{H-1}$ (step 270). In a process of multiplexing, the control information bit sequence $q_0, q_1, \ldots, q_{Q-1}$ can be arranged first and thereafter the data bit sequence $f_0, f_1, \ldots, f_{G-1}$ can be arranged. That is, if $H = G+Q$, $[g_0, g_1, \ldots, g_{H-1}]$ may be configured such as $[q_0, q_1, \ldots, q_{Q-1}, f_0, f_1, \ldots, f_{G-1}]$.

The multiplexed sequence $g_0, g_1, \ldots, g_{H-1}$ is mapped to a modulation sequence $h_0, h_1, \ldots, h_{H'-1}$ (step 280). Herein, $h_i$ denotes a modulation symbol on constellation, and $H'=H/Q_m$. $Q_m$ denotes the number of bits for each modulation symbol of a modulation scheme. For example, when quadrature phase shift keying (QPSK) is used as the modulation scheme, $Q_m=2$.

Figure 8:
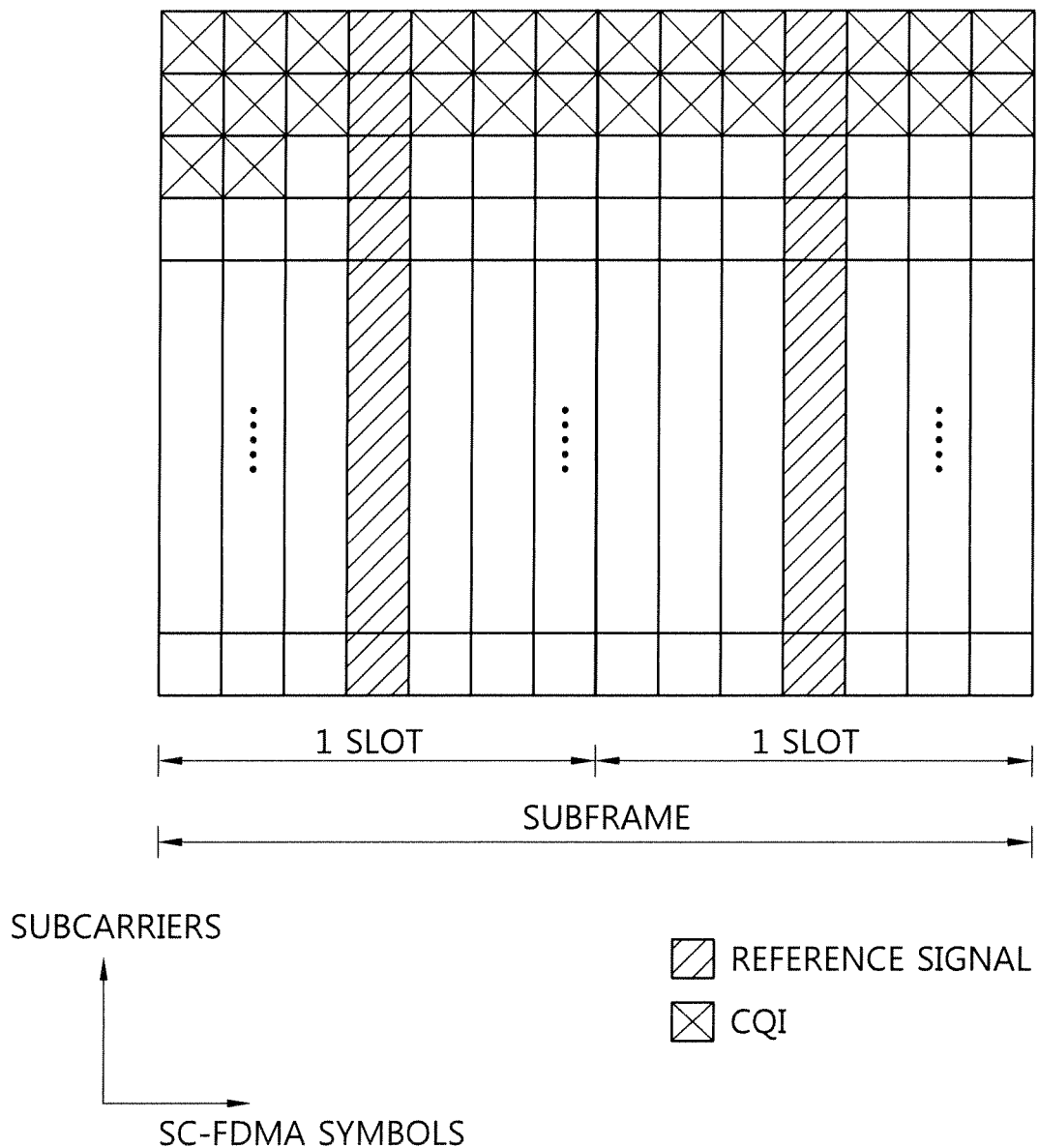
FIG. 8 shows resource mapping on a PUSCH.

Each modulation symbol of the modulation sequence $h_0, h_1, \ldots, h_{H'-1}$ is mapped to a resource element for the PUSCH (step 290). The resource element is a unit of allocation on a subframe defined with one SC-FDMA symbol (or OFDMA symbol) and one subcarrier. The modulation symbols are mapped in a time-first manner. FIG. 8 shows resource mapping on a PUSCH. One slot includes 7 SC-FDMA symbols. In each slot, a $4^{th}$ SC-FDMA symbol is used to transmit a reference signal. Therefore, up to 12 SC-FDMA symbols can be used for the PUSCH in one subframe. A modulation sequence $h_0, h_1, \ldots, h_{H'-1}$ is first mapped in a $1^{st}$ subcarrier region in an SC-FDMA symbol direction, and is then mapped in a $2^{nd}$ subcarrier region also in the SC-FDMA symbol direction. A front portion of the modulation sequence $h_0, h_1, \ldots, h_{H'-1}$ corresponds to a CQI. Thus, the CQI is first mapped to resource elements in a front subcarrier region.

As described above, to transmit the CQI on the PUSCH, an amount of resources required to transmit the CQI needs to be determined first. The amount of resources is determined based on a transmission parameter (e.g., MCS, etc.) used in CQI transmission. The transmission parameter for the CQI denotes a parameter used for CQI transmission, and includes various parameters for determining the MCS and/or the amount of resources. If the amount of resources is expressed by the number Q' of modulation symbols for the CQI, Q' can be determined by Equation 4 below.

$$Q' = \left\lceil \frac{(O+L) \cdot M_{sc} \cdot N_{symb}}{10^{\frac{-\Delta}{10}} \cdot \sum_{r=0}^{C-1} K_r} \right\rceil \quad \text{[Equation 4]}$$

In Equation 4, O denotes the number of CQI bits, L denotes the number of CRC bits, Δ denotes a parameter, C denotes a total number of code blocks, $K_r$ denotes the number of bits for a code block number r, $M_{sc}$ denotes the number of subcarriers used in PUSCH transmission, and $N_{symb}$ denotes the number of SC-FDMA symbols used in PUSCH transmission. Transmission parameters for determining the aforementioned Q' may be at least one of C, $K_r$, $M_{sc}$, and $N_{symb}$.

Now, a method of multiplexing retransmission data and a CQI and transmitting the multiplexed result through a PUSCH in a process of performing HARQ will be described.

When the HARQ is performed, the CQI may be transmitted by being multiplexed with initial data or retransmission data. This may occur when a CQI transmission period coincides with a retransmission period in periodic CQI reporting or when a response for a CQI transmission request coincides with the retransmission period in non-periodic CQI reporting.

When the CQI is multiplexed with the retransmission data, there is an issue as to how transmission parameters (e.g., MCS, etc.) for the CQI are determined. The issue is related to how to determine the transmission parameters used for the CQI multiplexed with the retransmission data. This is because, when the transmission parameters for CQI transmission have to be additionally reported by the BS to the UE even at retransmission, the reporting of the transmission parameters may act as a signaling overhead.

If the CQI is transmitted when the data is retransmitted, a CQI transmission parameter can be determined according to the transmission parameters used in initial data transmission. For example, an MCS used in initial data transmission is used for CQI transmission when the data is retransmitted.

Figure 9:
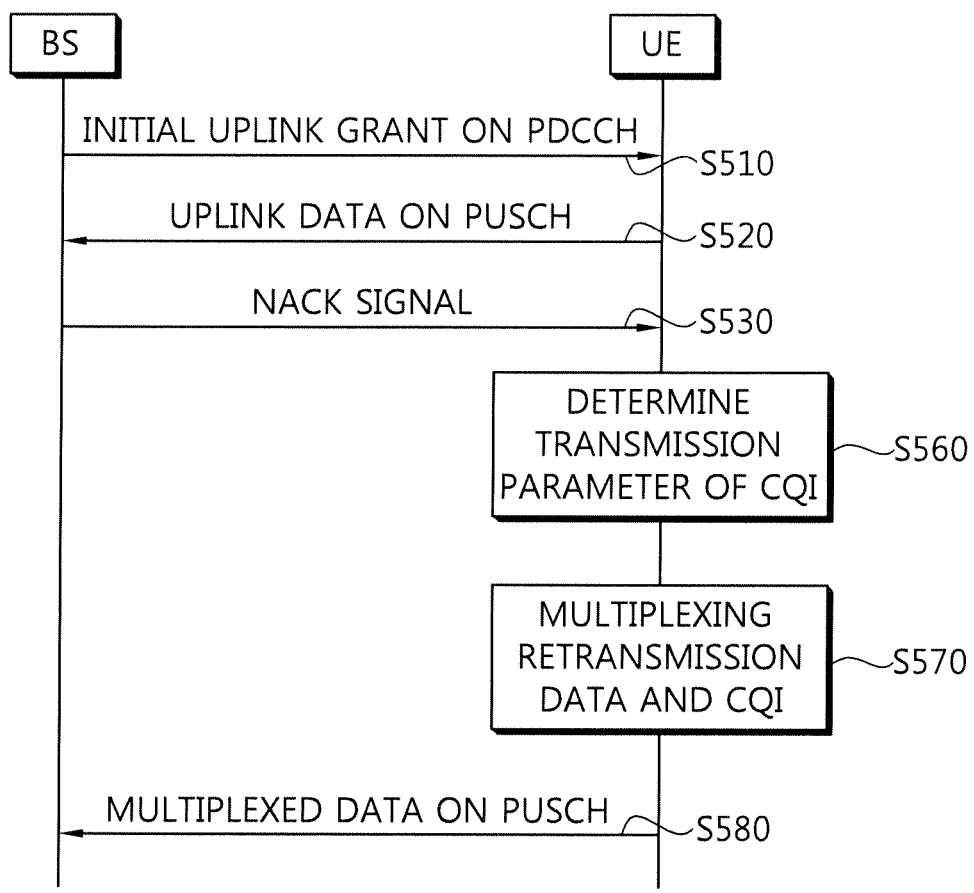
FIG. 9 is a flow diagram showing an HARQ method according to an embodiment of the present invention.

FIG. 9 is a flow diagram showing an HARQ method according to an embodiment of the present invention.

Referring to FIG. 9, in step S510, a BS transmits an initial uplink grant on a PDCCH. The initial uplink grant includes radio resource allocation information for initial uplink data in the HARQ method. In step S520, a UE transmits uplink data on a PUSCH indicated by the initial uplink grant.

In step S530, upon detecting a decoding error of the uplink data, the BS transmits a NACK signal as a retransmission request. The NACK signal may be transmitted on a PHICH.

In step S560, if a transmission subframe of retransmission data coincides with a transmission subframe of a CQI, the UE determines a transmission parameter of the CQI from the initial uplink grant. The transmission parameter is a parameter for determining an amount of radio resources required to transmit the CQI, and may be related to an MCS of the CQI. For example, when the amount of radio resources of the CQI is determined by Equation 4, at least one of transmission parameters C, $K_r$, $M_{sc}$, and $N_{symb}$ can be obtained from the initial uplink grant.

In step S570, the UE multiplexes the CQI and the retransmission data of the uplink data by using the transmission parameter. In step S580, the UE transmits the multiplexed data on the PUSCH.

In HARQ retransmission, when the retransmission data is transmitted together with the CQI, the MCS of the CQI is determined according to the initial uplink grant, so that a signaling overhead can be reduced without additional signaling for the transmission parameter of the CQI to be multiplexed.

Figure 10:
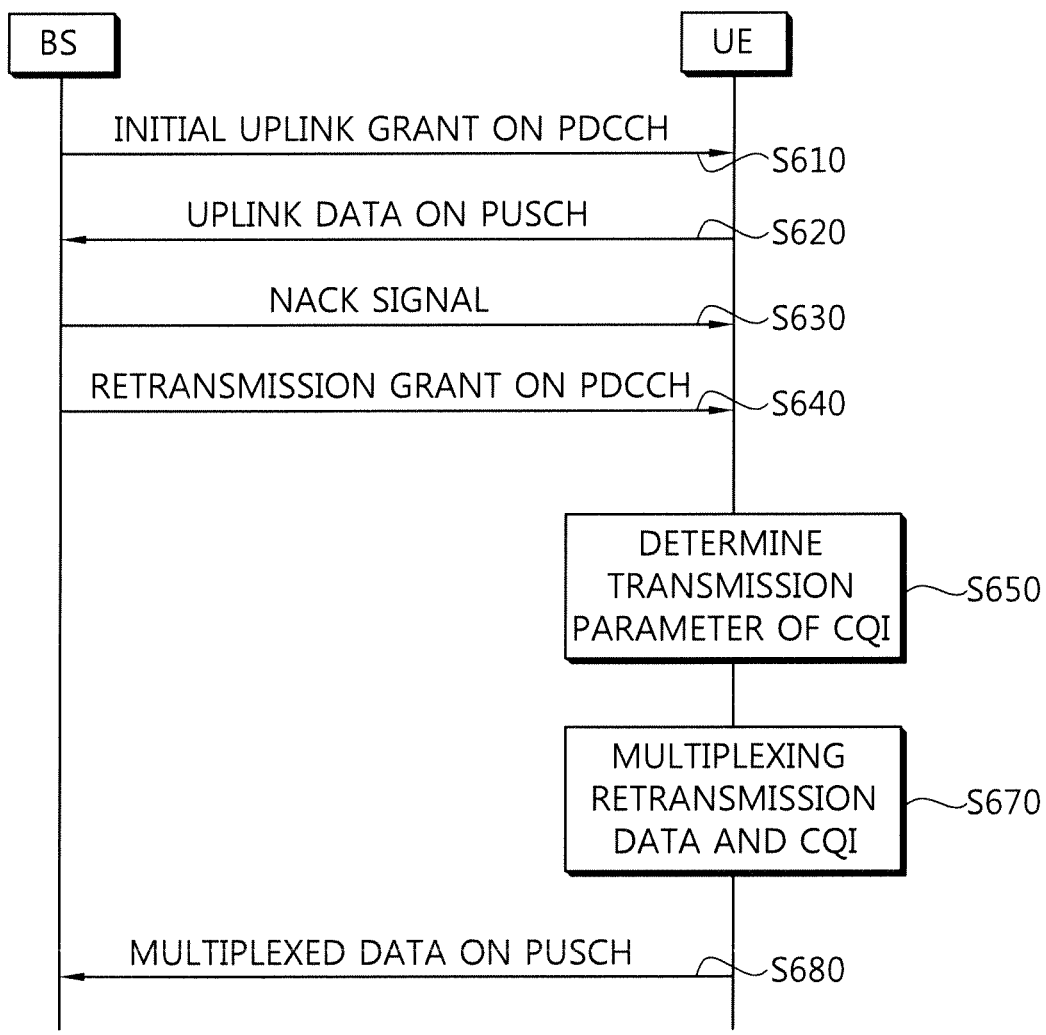
FIG. 10 is a flow diagram showing an HARQ method according to another embodiment of the present invention.

FIG. 10 is a flow diagram showing an HARQ method according to another embodiment of the present invention.

Referring to FIG. 10, in step S610, a BS transmits an initial uplink grant on a PDCCH. In step S620, a UE transmits uplink data on a PUSCH indicated by the initial uplink grant. In step S630, upon detecting a decoding error of the uplink data, the BS transmits a NACK signal as a retransmission request.

In step S640, the BS transmits a retransmission grant on the PDCCH. The retransmission grant includes radio resource allocation information for retransmission data regarding the uplink data.

In step s650, if a transmission subframe of retransmission data coincides with a transmission subframe of a CQI, the UE determines a transmission parameter of the CQI from the initial uplink grant. In step S670, the UE multiplexes the CQI and the retransmission of the uplink data by using the transmission parameter. In this case, the retransmission data is multiplexed using a transmission parameter obtained from the retransmission grant, and the CQI is multiplexed using a transmission parameter obtained from the initial grant. In step S680, the UE transmits the multiplexed data on the PUSCH.

Figure 11:
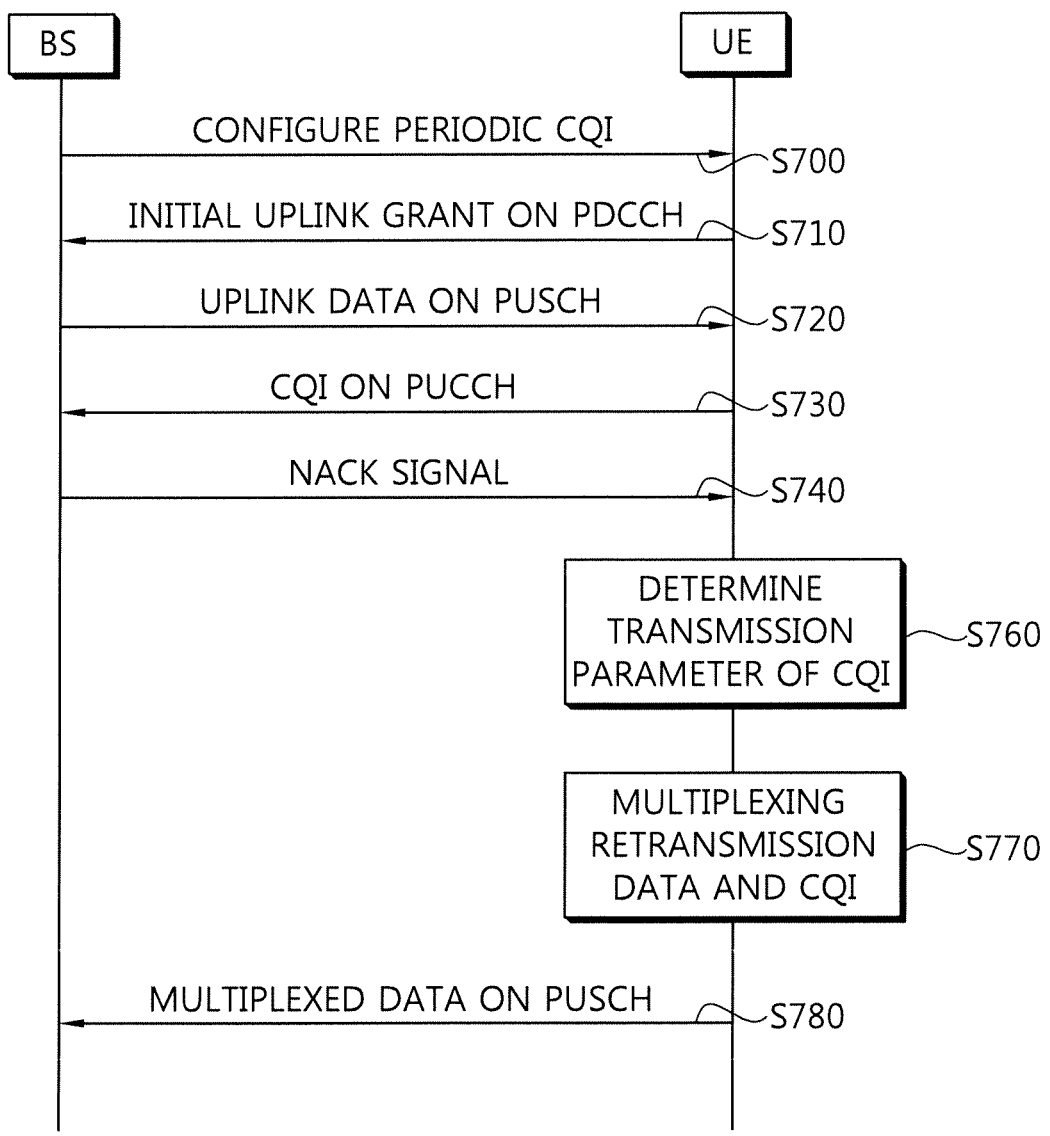
FIG. 11 is a flow diagram showing an HARQ method according to another embodiment of the present invention.

FIG. 11 is a flow diagram showing an HARQ method according to another embodiment of the present invention.

Referring to FIG. 11, in step S700, a BS configures a periodic CQI. A UE periodically transmits the CQI according to a period determined by the BS. In step S710, the BS transmits an initial uplink grant on a PDCCH. The initial uplink grant includes radio resource allocation information for initial uplink data in the HARQ method. In step S720, the UE transmits uplink data on a PUSCH indicated by the initial uplink grant.

In step S730, the UE transmits the CQI at a CQI transmission period. In this case, if an available PUCCH resource exists, the CQI can be transmitted on a PUCCH. In step S740, upon detecting a decoding error of the uplink data, the BS transmits a NACK signal as a retransmission request.

In step S760, if a transmission subframe of retransmission data coincides with a transmission subframe of a CQI, the UE determines a transmission parameter of the CQI from the initial uplink grant.

In step S770, the UE multiplexes the CQI and the retransmission data of the uplink data by using the transmission parameter. In step S780, the UE transmits the multiplexed data on the PUSCH.

Figure 12:
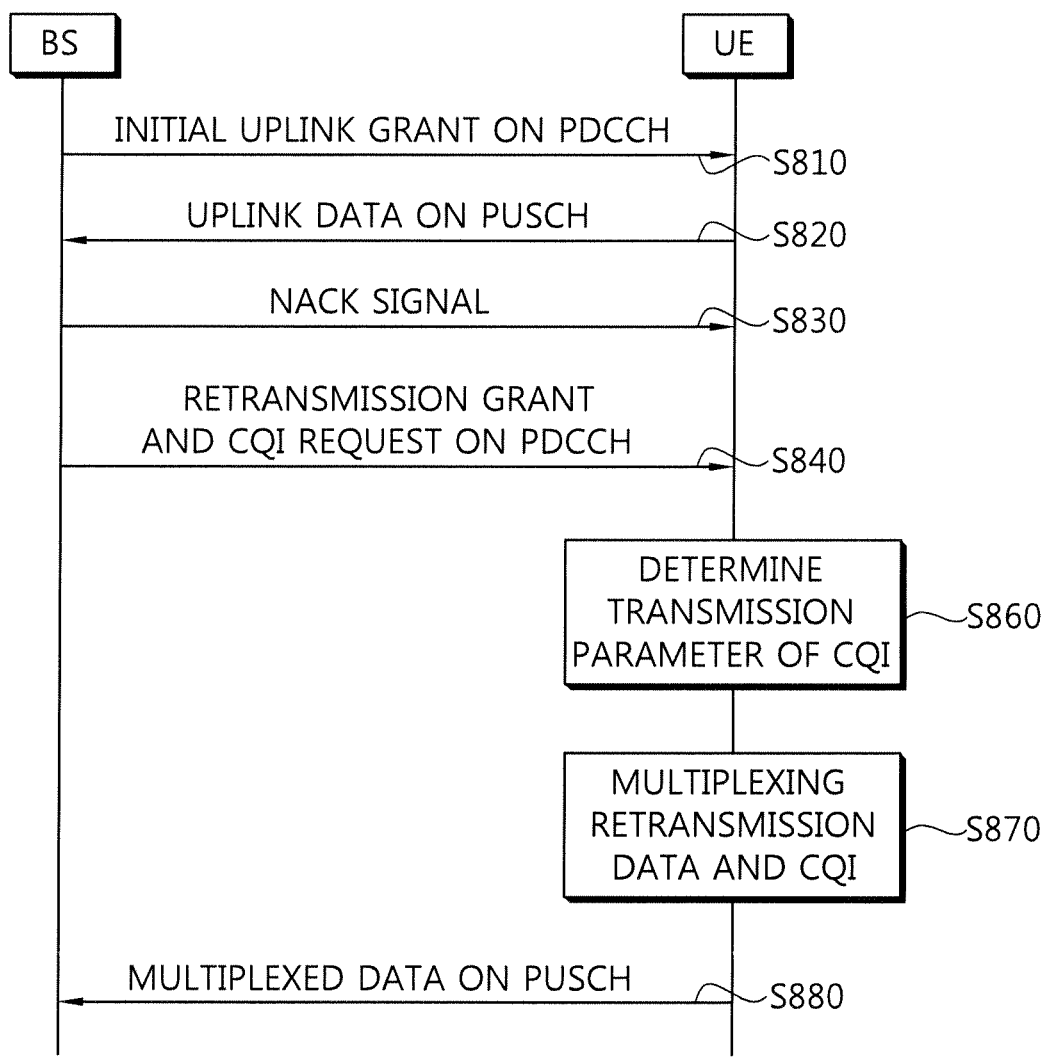
FIG. 12 is a flow diagram showing an HARQ method according to another embodiment of the present invention.

FIG. 12 is a flow diagram showing an HARQ method according to another embodiment of the present invention.

Referring to FIG. 12, in step S810, a BS transmits an initial uplink grant on a PDCCH. In step S820, a UE transmits uplink data on a PUSCH indicated by the initial uplink grant. In step S830, upon detecting a decoding error of the uplink data, the BS transmits a NACK signal as a retransmission request.

In step s840, the BS transmits a retransmission grant and a CQI request on the PDCCH. The CQI request is a signal optionally used by the BS to request the UE to transmit the CQI. Although the CQI request is transmitted on the PDCCH together with the retransmission grant, the CQI request can be transmitted to the UE through an additional message.

In step S860, the UE determines a transmission parameter of the CQI from the initial uplink grant according to the CQI request of the BS. In step S870, the UE multiplexes the CQI and the retransmission of the uplink data by using the transmission parameter. In this case, the retransmission data is multiplexed using a transmission parameter obtained from the retransmission grant, and the CQI is multiplexed using a transmission parameter obtained from the initial grant. In step S880, the UE transmits the multiplexed data on the PUSCH.

Although CQI multiplexing at first retransmission has been proposed in the aforementioned embodiments, the CQI transmission parameter can be obtained from the initial uplink grant even if the CQI is transmitted by being multiplexed at n-th retransmission (where n>1).

By using the transmission parameter used in initial data transmission as the CQI transmission parameter, additional signaling for the CQI transmission parameter is not necessary.

While performing the HARQ, to multiplex and transmit the retransmission data and the CQI on the PUSCH, a CQI transmission parameter can be obtained not only from the initial uplink grant but also from other grants. For example, the transmission parameter used for the retransmission data multiplexed together with the CQI can be set to the CQI transmission parameter. This is a case where the same MCS used for the retransmission data is used to transmit the CQI at retransmission. For another example, the transmission parameter used in previous transmission can be used as the CQI transmission parameter. This is a case where, when second retransmission data and the CQI are multiplexed at second retransmission, the transmission parameter used for the first retransmission data is set to the CQI transmission parameter.

As described above, a non-periodic CQI is transmitted at the request of the BS. In general, the CQI request can be transmitted on the PDCCH. In this case, a transmission indicator for the CQI transmission parameter can be transmitted along with the CQI request. The CQI may be transmitted using an allocated resource (or transmission parameter) according to the transmission indicator, or the CQI may be transmitted using a previously allocated resource (or transmission parameter).

Figure 13:
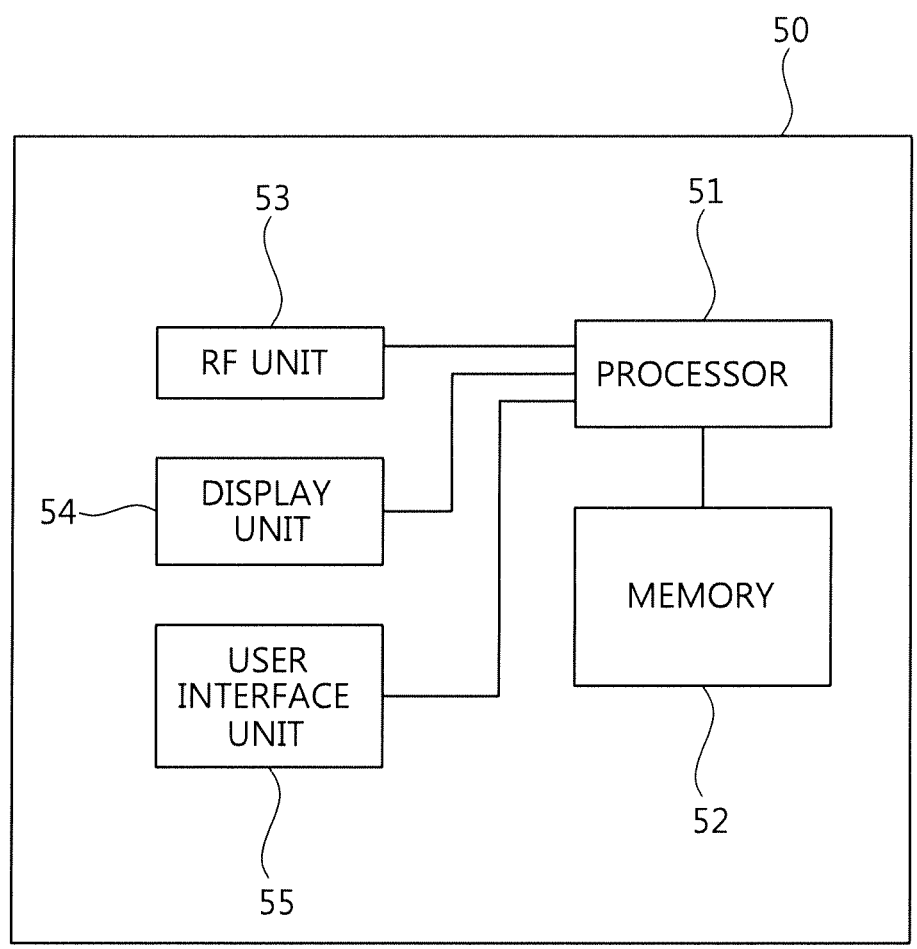
FIG. 13 is a block diagram showing an apparatus for wireless communication according to an embodiment of the present invention.

FIG. 13 is a block diagram showing an apparatus for wireless communication according to an embodiment of the present invention. An apparatus 50 for wireless communication may be a part of a UE. The apparatus 50 for wireless communication includes a processor 51, a memory 52, a radio frequency (RF) unit 53, a display unit 54, and a user interface unit 55. The RF unit 53 is coupled to the processor 51 and transmits and/or receives radio signals. The memory 52 is coupled to the processor 51 and stores an operating system, applications, and general files. The display unit 54 displays a variety of information of the UE and may use a well-known element such as a liquid crystal display (LCD), an organic light emitting diode (OLED), etc. The user interface unit 55 can be configured with a combination of well-known user interfaces such as a keypad, a touch screen, etc. The processor 51 supports HARQ and AMC. The processor 51 can configure a PUCCH or a PUSCH and can perform multiplexing of data and a CQI. The aforementioned embodiments of the HARQ method can be implemented by the processor 51.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for supporting retransmission in a wireless communication system, the method performed by a user equipment (UE) and comprising:
   determining to transmit a first type channel quality indicator (CQI) among the first type CQI and a second type CQI based on an aperiodic CQI reporting indication bit, wherein the first type CQI is a CQI to be transmitted aperiodically and the second type CQI is a CQI to be transmitted periodically;
   multiplexing retransmission data of an initial uplink data with the first type CQI, wherein a radio resource for the first type CQI is determined based on a transmission parameter indicating an allocated resource used for transmission of the initial uplink data; and
   transmitting the multiplexed data on a physical uplink shared channel (PUSCH).

2. The method of claim 1, wherein the second type CQI is to be transmitted on a physical uplink control channel (PUCCH).

3. The method of claim 1, further comprising:
   receiving an initial uplink grant on a physical downlink control channel (PDCCH),
   wherein the initial uplink grant is used for the transmission of the initial uplink data.

4. The method of claim 1, wherein the UE supports Hybrid Automatic Repeat Request (HARD).

5. The method of claim 1, further comprising:
   receiving a request for retransmission of the initial uplink data on a physical HARQ indicator channel (PHICH),
   wherein the retransmission is performed in response to the request.

6. A user equipment (UE) for supporting retransmission in a wireless communication system, comprising:
   a radio frequency unit configured to transmit and receive a radio signal; and
   a processor coupled to the radio frequency unit and configured to:
   determine to transmit a first type channel quality indicator (CQI) among the first type CQI and a second type CQI based on an aperiodic CQI reporting indication bit, wherein the first type CQI is a CQI to be transmitted aperiodically and the second type CQI is a CQI to be transmitted periodically;
   multiplex retransmission data of an initial uplink data with the first type CQI, wherein a radio resource for the first type CQI is determined based on a transmission parameter indicating an allocated resource used for transmission of the initial uplink data; and
   transmit the multiplexed data on a physical uplink shared channel (PUSCH).

7. The UE of claim 6, wherein second type CQI is to be transmitted on a physical uplink control channel (PUCCH).

8. The UE of claim 6, wherein the processor is further configured to:
   receive an initial uplink grant on a physical downlink control channel (PDCCH),
   wherein the initial uplink grant is used for the transmission of the initial uplink data.

9. The UE of claim 6, wherein the UE supports Hybrid Automatic Repeat Request (HARQ).

10. The UE of claim 6, wherein the processor is further configured to:
   receive a request for retransmission of the initial uplink data on a physical HARQ indicator channel (PHICH), wherein the retransmission is performed in response to the request.

* * * * *